United States Patent
Yoo

(10) Patent No.: US 8,764,265 B2
(45) Date of Patent: Jul. 1, 2014

(54) BACKLIGHT UNIT AND LIQUID CRYSTAL MODULE USING THE SAME

(75) Inventor: Jung Sun Yoo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 864 days.

(21) Appl. No.: 11/451,412

(22) Filed: Jun. 13, 2006

(65) Prior Publication Data

US 2007/0064442 A1    Mar. 22, 2007

(30) Foreign Application Priority Data

Sep. 16, 2005  (KR) .......................... 10-2005-0086625

(51) Int. Cl.
*F21V 7/04*    (2006.01)

(52) U.S. Cl.
USPC ............ 362/612; 362/555; 362/561; 362/633

(58) Field of Classification Search
USPC ......... 362/555, 600, 608, 610–613, 615, 623, 362/624, 633; 315/169.1, 185 R, 200 R; 349/65, 68, 70
See application file for complete search history.

(56) References Cited

U.S. PATENT DOCUMENTS

| | | | | |
|---|---|---|---|---|
| 6,134,092 A * | 10/2000 | Pelka et al. | ...................... | 361/31 |
| 6,239,716 B1 * | 5/2001 | Pross et al. | ................. | 340/815.4 |
| 7,156,538 B2 * | 1/2007 | Han et al. | ...................... | 362/249 |
| 7,201,488 B2 * | 4/2007 | Sakamoto et al. | ............ | 362/133 |
| 7,220,040 B2 * | 5/2007 | Lengyel et al. | ............... | 362/612 |
| 7,244,044 B2 * | 7/2007 | Liao | .............................. | 362/555 |
| 7,556,415 B2 * | 7/2009 | Hamada et al. | ............... | 362/612 |
| 2005/0141244 A1 * | 6/2005 | Hamada et al. | ............... | 362/612 |
| 2005/0157515 A1 * | 7/2005 | Chen et al. | .................... | 362/555 |
| 2006/0256579 A1 * | 11/2006 | Yang et al. | .................... | 362/613 |

* cited by examiner

*Primary Examiner* — Hargobind S Sawhney

(74) *Attorney, Agent, or Firm* — McKenna Long & Aldridge LLP

(57) ABSTRACT

This invention relates to a backlight unit that is adaptive for increasing brightness uniformity, and a liquid crystal module using the same. The backlight unit includes a plurality of light emitting diodes with the $(2i-1)^{th}$ (where i is a natural number) light emitting diodes of the plurality connected in a first series circuit between an input terminal and an output terminal and the $2i^{th}$ light emitting diodes of the plurality connected in a second series circuit. The second series circuit is connected in parallel with the first series circuit between the input terminal and the output terminal, and each of the $2i^{th}$ light emitting diodes is disposed adjacent to a respective $(2i-1)^{th}$ light emitting diode.

6 Claims, 7 Drawing Sheets

BACKLIGHT UNIT AND LIQUID CRYSTAL MODULE USING THE SAME

This application claims the benefit of Korean Patent Application No. P2005-0086625, filed on Sep. 16, 2005, which is hereby incorporated by reference for all purposes as if fully set forth herein.

BACKGROUND OF THE INVENTION

1. Field of the Invention

The present invention relates to a liquid crystal module, and more particularly to a backlight unit for uniformly illuminating a liquid crystal display, and a liquid crystal module using the same.

2. Description of the Related Art

A liquid crystal display device is not a self-luminous display device, and requires a separate light source like a backlight unit to display an image. A liquid crystal display device includes a liquid crystal display panel with liquid crystal cells arranged in a matrix; a liquid crystal module including a backlight unit for irradiating light to the liquid crystal display panel; a drive circuit unit for driving the liquid crystal module; and a case.

The types of devices for the light source of the backlight unit include a cold cathode fluorescent lamp (CCFL); a hot cathode fluorescent lamp (HCFL); an external electrode fluorescent lamp (EEFL); and a light emitting diode (LED). The backlight unit may be classified as either an edge type or a direct type in accordance with the location in which the light source is installed.

Referring to FIG. 1, a liquid crystal module of the related art using an edge type LED backlight includes a backlight unit 12 to supply light and a liquid crystal display panel 11 to receive the light from the backlight unit 12 to display a picture.

The liquid crystal display panel 11 includes an upper substrate 13 on which a black matrix, a color filter array, a common electrode and an alignment film are sequentially formed; a lower substrate 14 on which a TFT array, a pixel electrode and an alignment film are sequentially formed; an upper polarizer 15 attached to an upper surface of the upper substrate 13; a lower polarizer 16 attached to a lower surface of the lower substrate 14; a spacer (not shown) for maintaining a gap between the upper and lower substrates; and a liquid crystal injected into a space between the upper and lower substrates 13 and 14. The upper substrate 13 and the lower substrate 14 are bonded together by a sealant.

The backlight unit 12 of the related art includes a light emitting diode (hereinafter, referred to as 'LED') 20 to generate light; a printed circuit board (hereinafter, referred to as 'PCB') 21 on which the LED 20 is mounted; a housing 22 encompassing the LED 20 and the PCB 21; a light guide panel 17 for redirecting light emitted from by LED 20 to illuminate a surface of the liquid crystal display panel; a reflection plate 18 located at the lower part of the light guide panel 17 for reflecting the light traveling to the lower and side surfaces of the light guide panel 17 to the upper surface of the light guide panel; and optical sheets 19 for controlling the diffusion and path of light passing through the light guide panel.

The LED 20 is a self-luminous device. The light generated by the LED 20 is determined by the amount of current supplied to the LED 20. The light generated by the LED 20 illuminates the light guide panel 17 at an incidence surface of the light guide panel 17.

The housing 22 has a reflective inner surface to reflect the light from the LED 20 to the incidence surface of the light guide panel 17.

The reflection plate 18 is installed to face the rear surface of the light guide panel 17. The light guide panel 17 distributes the light incident from the LED 20 to locations at a distance from the LED 20.

The reflection plate 18 re-reflects the light incident on the reflection plate 18 from the rear surface of the light guide panel 17, thereby acting to reduce light loss. The light from the LED 20 is reflected at a designated tilt angle by the reflection plate 18 to the rear surface of the light guide panel 17 to travel to an exiting surface of light guide panel. The light traveling to the lower and side surfaces of the light guide panel 17 is reflected at the reflection plate 18 to travel to the exiting surface of the light guide panel 17.

Optical sheets 19 control the diffusion and direction of travel of light exiting through the exiting surface of the light guide panel 17. To this end, the optical sheets 19 include a diffusion sheet for diffusing the light exiting through the exiting surface of the light guide panel 17 to an entire surface of the liquid crystal display panel; a prism sheet for controlling the direction of the light exiting from the light guide panel 17; and a protection sheet for protecting the prism sheet.

The liquid crystal module includes structures such as a support main for supporting the liquid crystal display panel 11 and the backlight unit 12 and protecting the components from external impacts; a case top; and a cover bottom.

A problem associated with the LED backlight unit 12 of the related art is described below with reference to FIG. 2.

FIG. 2 is a plan view showing an arrangement structure of LEDs 20 mounted on a PCB 21.

Referring to FIG. 2, a plurality of LEDs 20 is arranged on the PCB 21. The LEDs 20 are arranged in a series-parallel connection structure. In such an arrangement structure, a difference in characteristics of the LEDs results in a difference between the amount of a current (I1) flowing through the LEDs 20 in a group A and the amount of a current (I2) flowing through the LEDs 20 in a group B. The difference in the current amounts flowing in the groups of LEDs results in a difference in the light emitted by the groups of LED 20. The difference in emitted light between group A LEDs and group B LEDs results in non-uniform brightness in the light incident on the liquid crystal display panel 1, as shown in FIG. 3.

The use of current mirror circuits has been proposed as a solution to problems associated with differences in LED currents. However, current mirror circuits use a plurality of semiconductor devices. The semiconductor devices increase the cost of liquid crystal display devices.

SUMMARY OF THE INVENTION

Accordingly, the present invention is directed to a backlight unit and liquid crystal module using the same that substantially obviates one or more of the problems due to limitations and disadvantages of the related art.

An advantage of the present invention is to provide a backlight unit producing illumination with improved uniformity, and a liquid crystal module using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit according to an aspect of the present invention includes a plurality of light emitting diodes wherein $(2i-1)^{th}$ (where i is a natural number, a natural number being a positive integer) light emitting diodes of the plurality are connected in a first series circuit between an input terminal and an output terminal and $2i^{th}$ light emitting diodes of the plurality are connected in a second series circuit, the second series circuit connected in parallel with the first series circuit between the input terminal and the output terminal, and wherein each of the $2i^{th}$ light emitting diodes is disposed adjacent to a respective $(2i-1)^{th}$ light emitting diode.

In another aspect of the present invention, a liquid crystal module, includes: a backlight unit including a plurality of light emitting diodes, wherein the $(2i-1)^{th}$ (where i is a natural number) light emitting diodes of the plurality are connected in a first series circuit between an input terminal and an output terminal; and the $2i^{th}$ light emitting diodes of the plurality are connected in a second series circuit, the second series circuit connected in parallel with the first series circuit between the input terminal and the output terminal, and wherein each of the $2i^{th}$ light emitting diodes is linearly disposed adjacent to a respective $(2i-1)^{th}$ light emitting diode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrated embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Embodiments of the present invention will be described with reference to FIGS. 4 to 7.

Figure 1:
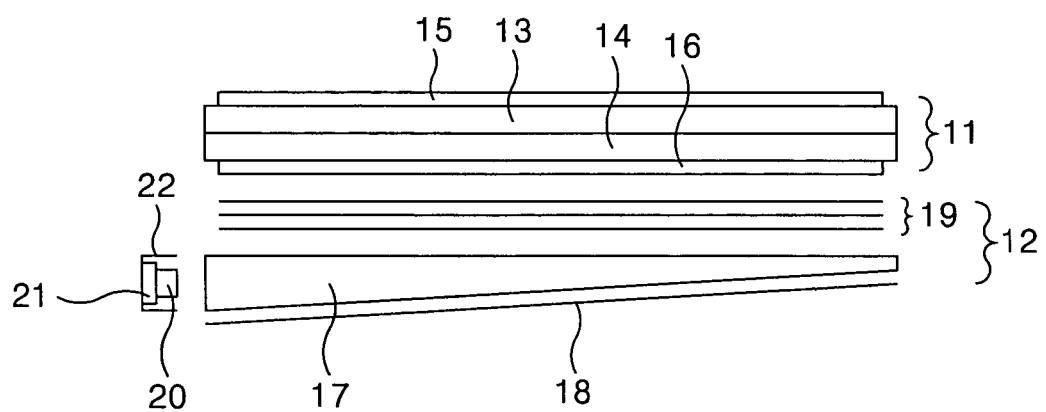
FIG. 1 is a diagram schematically illustrating a liquid crystal module of the related art.
Figure 2:
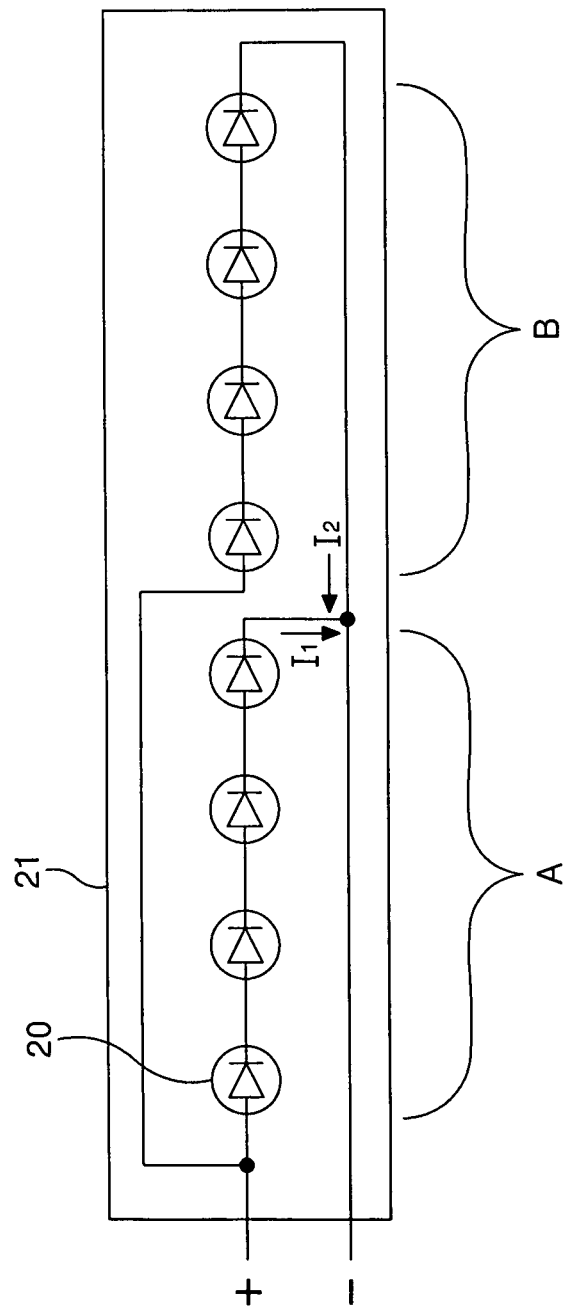
FIG. 2 is a diagram schematically illustrating an arrangement of light emitting diodes of FIG. 1.
Figure 3:
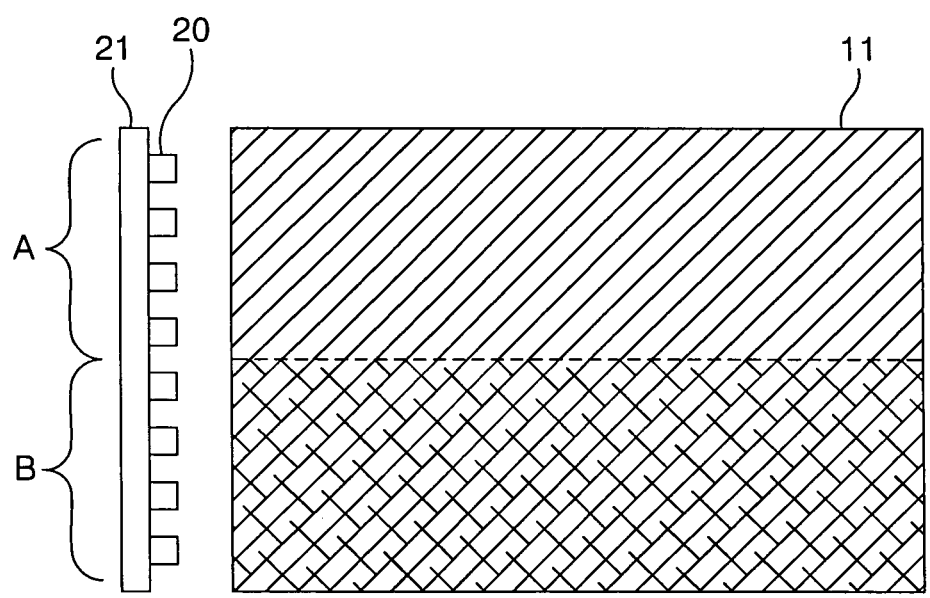
FIG. 3 is a diagram schematically illustrating a brightness distribution a liquid crystal display panel of FIG. 1.
Figure 4:
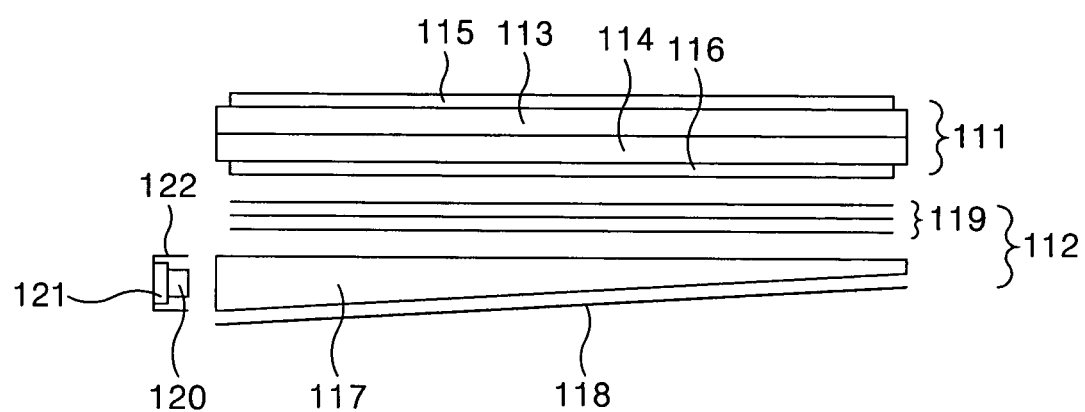
FIG. 4 is a diagram schematically illustrating a liquid crystal module according to an embodiment of the present invention.

As shown in FIG. 4, a liquid crystal module according to the embodiment of the present invention includes a backlight unit 112 that supplies light and a liquid crystal display (LCD) panel 111 that receives the light irradiated from the backlight unit 112 to display a picture.

The liquid crystal display panel 111 includes an upper substrate 113 upon which a black matrix, a color filter array, a common electrode and an alignment film are sequentially formed; a lower substrate 114 upon which a TFT array, a pixel electrode and an alignment film are sequentially formed; an upper polarizer 115 attached to the upper substrate 113; a lower polarizer 116 attached to a lower surface of the lower substrate 114; a spacer for maintaining a gap between the upper and lower plates; and a liquid crystal injected into a space between the upper and lower substrates 113 and 114. The upper substrate 113 and the lower substrate 114 are bonded together by a sealant.

The backlight unit 112 includes an LED 120 which generates light; a PCB 121 on which the LED 120 is mounted; a housing 122 encompassing the LED 120 and the PCB 121; a light guide panel 117 for converting the incident light from the LED 120 into a surface light; a reflection plate 118 located in the lower part of the light guide panel 117 for reflecting the light traveling to the lower and side surfaces of the light guide panel 117 towards the upper surface of the light guide panel; and optical sheets 119 for controlling the diffusion and the direction of travel of the light after it passes through the light guide panel.

The LEDs 120 are self-luminous devices emitting an amount of light in accordance with the amount of current supplied to the LEDs 120. The LEDs 120 are mounted on the PCB 121. The number of the LEDs 120 mounted on the PCB may vary in accordance with the size of the liquid crystal display panel 111. The light generated by the LEDs 120 is incident on the light guide panel 117 at the incidence surface of the light guide panel 117.

The housing 122 has an interior specular or reflective surface to reflect the light from the LED 120 to the incidence surface of the light guide panel 117.

The reflection plate 118 is installed to face in the rear surface of the light guide panel 117. The light guide panel 117 directs the light incident from the LED 120 to reach places distant from the LED 120.

The reflection plate 118 re-reflects the light incident to itself through the rear surface of the light guide panel 117, thereby acting to reduce light loss. The light from the LED 120 is reflected at a designated tilt angle at the reflection plate 118 of the rear surface to travel uniformly to an exiting surface when the light is incident to the light guide panel 117. The light traveling to the lower and side surfaces of the light guide panel 117 is reflected at the reflection plate 118 to travel to the exiting surface of the light guide panel 117.

Optical sheets 119 control the diffusion and direction of the light exiting through the exiting surface of the light guide panel 117. To this end, the optical sheets 119 may include a diffusion sheet for diffusing the light exiting through the exiting surface of the light guide panel 117 over a surface; a prism sheet for controlling the direction of travel of the light exiting from the light guide panel 117; and a protection sheet for protecting the prism sheet.

The liquid crystal module includes structures such as a support main for supporting the liquid crystal display panel 111 and the backlight unit 112 and protecting these components from external impacts; a case top; and a cover bottom.

Figure 5:
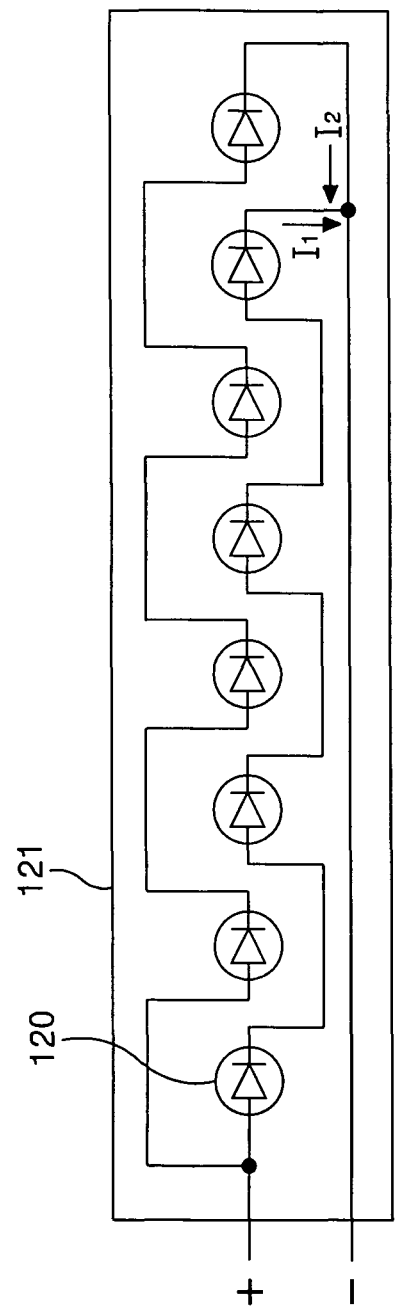
FIG. 5 is a diagram schematically illustrating an arrangement of light emitting diodes of FIG. 4.

FIG. 5 is a plan view showing an arrangement structure of the LED 120 mounted on the PCB 121.

Referring to FIG. 5, a plurality of LEDs 120 is arranged on the PCB 121. The LEDs 120 are connected in series-parallel circuit structures. The $(2i-1)^{th}$ (where i is a natural number)

LEDs are connected in a first series circuit between an input terminal (+) and an output terminal (−), while the $2i^{th}$ LEDs are connected in a second series circuit between the input terminal (+) and the output terminal (−). Thus, the first and second series circuits are connected in parallel between the input terminal (+) and the output terminal (−). Each of the $2i^{th}$ LEDs are disposed to be adjacent to the respective $(2i-1)^{th}$ LEDs. By way of example, for the LEDs linearly arranged in order of a first LED, a second LED, a third LED, a fourth LED, the cathode of a $k^{th}$ LED (where k is an odd number), for example, the first LED, is connected to the anode of a $(k+2)^{th}$ light emitting diode, that is, the third LED. The cathode of an $m^{th}$ (where m is an even number) light emitting diode, or the second LED, is connected to the anode of an $(m+2)^{th}$ light emitting diode, that is the fourth LED.

Figure 6:
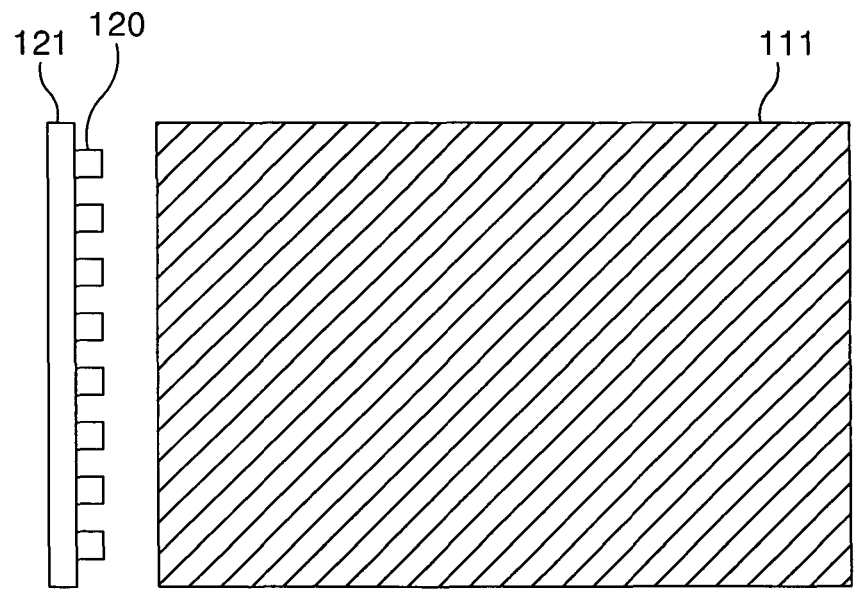
FIG. 6 is a diagram schematically illustrating a brightness distribution on a liquid crystal display panel of FIG. 4.

With the above described structure, even with a difference between the amount of the current (I1) flowing through the $(2i-1)^{th}$ LEDs and the amount of the current (I2) flowing through the $2i^{th}$ LEDs, by positioning each of the $(2i-1)^{th}$ LEDs adjacent to the respective $2i^{th}$ LED, the light emitted by the LEDs is uniformly distributed to the liquid crystal display panel as shown in FIG. 6.

Because the backlight unit according to the present invention can increase the uniformity of the intensity of light delivered to a liquid crystal display panel even when different currents flow through the LEDs, uniform light distribution can be achieved without the additional cost associated with current equalizing devices such as current mirror circuitry.

Figure 7:
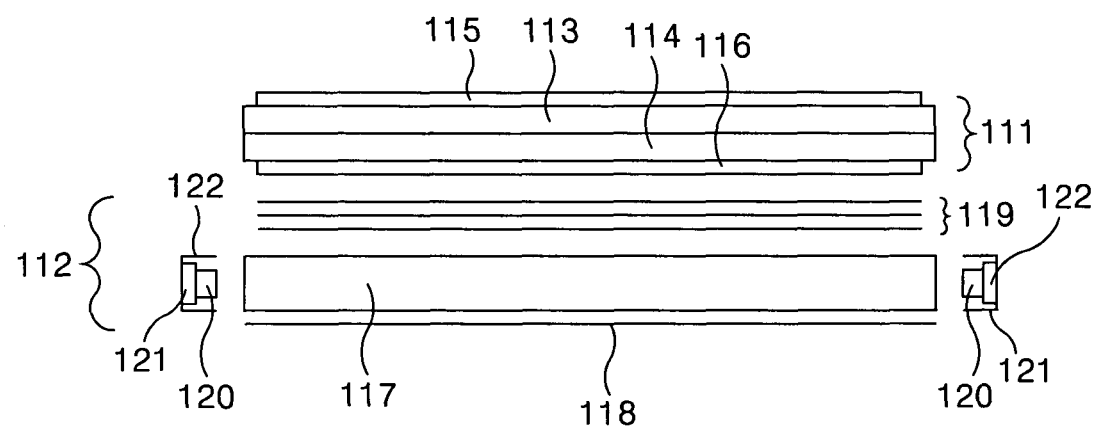
FIG. 7 is a diagram schematically illustrating a backlight unit according to another embodiment of the invention.

As illustrated in FIG. 7, in another embodiment of the present invention LEDs are provided on both sides of the light guide panel. The LEDs on each side of the light guide panel are arranged and connected in the configurations described with respect to the embodiment illustrated in FIG. 5.

Although in the embodiments of the invention described above, the LEDs have been described as being arranged in a single row, the LEDs may alternatively be arranged in a plurality of rows.

As described above, a backlight unit and a liquid crystal module using the same according to the present invention includes a plurality of light emitting diodes with each of the $(2i-1)^{th}$ (where i is a natural number) light emitting diodes connected in series between the input terminal and the output terminal while each of the $2i^{th}$ light emitting diodes is connected in series between the input terminal and the output terminal. The $2i^{th}$ light emitting diodes are disposed linearly adjacent to a respective $(2i-1)^{th}$ light emitting diode, thereby having the effect of the uniformity increase of brightness and the cost reduction.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
   a light guide panel;
   a printed circuit board disposed on one side of the light guide panel;
   a plurality of light emitting diodes mounted on the printed circuit board only in a low, wherein the light emitting diodes include an odd numbered light emitting diodes connected in a first series and an even light emitting diodes connected in a second series, wherein the odd numbered light emitting diodes and the even numbered light emitting diodes are connected in parallel, and alternatively disposed in only one row on the side of the light guide panel, wherein each of the odd numbered light emitting diodes is disposed between the even numbered light emitting diodes;
   a housing installed to encompass the light emitting diodes and the printed circuit board;
   a reflection plate located in a lower part of the light guide panel for reflecting the light traveling to lower and side surfaces of the light guide panel to an upper surface of the light guide panel;
   optical sheets for controlling a diffusion and a direction of travel of the light passing through the light guide panel; and
   a supporting member for supporting the housing, the light guide panel, the reflection plate and the optical sheets,
   wherein the light emitting diodes are disposed in the housing in only one row,
   wherein the housing includes a first part facing the printed circuit board, a second part extending from the first part and a third part extending from the first part,
   wherein the second part directly faces one side of the one row of the light emitting diodes,
   wherein the third part directly faces other side of the one row of the light emitting diodes,
   wherein the housing includes a reflective surface reflecting a light from the light emitting diodes.

2. The backlight unit according to claim 1, wherein the odd numbered light emitting diodes include a $k^{th}$ (where k is an odd number) light emitting diode and a $(k+2)^{th}$ light emitting diode, and a cathode of the $k^{th}$ light emitting diode is connected to an anode of the $(k+2)^{th}$ light emitting diode; and the even numbered light emitting diodes include an $m^{th}$ (where m is an even number) light emitting diode and a $(m+2)^{th}$ light emitting diode, and a cathode of the $m^{th}$ light emitting diode is connected to an anode of the $(m+2)^{th}$ light emitting diode.

3. The backlight unit according to claim 1, wherein the light emitting diodes are formed at both sides of the light guide panel.

4. A liquid crystal module, comprising:
   a light guide panel;
   a printed circuit board disposed on one side of the light guide panel;
   a plurality of light emitting diodes mounted on the printed circuit board only in a low, wherein the light emitting diodes include an odd numbered light emitting diodes connected in a first series and an even light emitting diodes connected in a second series, wherein the odd numbered light emitting diodes and the even numbered light emitting diodes are connected in parallel, and alternatively disposed in only one row on the side of the light guide panel, wherein each of the odd numbered light emitting diodes is disposed between the even numbered light emitting diodes;
   a housing installed to encompass the light emitting diodes and the printed circuit board;
   a reflection plate located in a lower part of the light guide panel for reflecting the light traveling to lower and side surfaces of the light guide panel to an upper surface of the light guide panel;
   optical sheets for controlling a diffusion and a direction of travel of the light passing through the light guide panel;
   a liquid crystal display panel disposed on the optical sheets for receiving a light irradiated from the light emitting diodes and to realize a picture; and
   a supporting member for supporting the housing, the light guide panel, the reflection plate, the optical sheets and the liquid crystal display panel, wherein the light emitting diodes are disposed in the housing in only one row, wherein the housing includes a first part facing the printed circuit board, a second part extending from the first part and a third part extending from the first part, wherein the second part directly faces one side of the one row of the light emitting diodes, wherein the third part directly faces other side of the one row of the light emitting diodes, wherein the housing includes a reflective surface reflecting a light from the light emitting diodes.

5. The liquid crystal module according to claim 4, wherein the odd numbered light emitting diodes include a $k^{th}$ (where k is an odd number) light emitting diode and a $(k+2)^{th}$ light emitting diode, and a cathode of the $k^{th}$ light emitting diode is connected to an anode of the $(k+2)^{th}$ light emitting diode; and the even numbered light emitting diodes include an $m^{th}$ (where m is an even number) light emitting diode and a $(m+2)^{th}$ light emitting diode, and a cathode of the $m^{th}$ light emitting diode is connected to an anode of the $(m+2)^{th}$ light emitting diode.

6. The liquid crystal module according to claim 4, wherein the light emitting diodes are formed at both sides of the light guide panel.

* * * * *